(12) United States Patent
Kosaraju (10) Patent No.: US 7,133,957 B2
(45) Date of Patent: Nov. 7, 2006

(54) METHOD AND AN APPARATUS FOR A RE-CONFIGURABLE PROCESSOR

(75) Inventor: Chakravarthy Kosaraju, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 10/918,586

(22) Filed: Aug. 13, 2004

(65) Prior Publication Data

US 2005/0021897 A1 Jan. 27, 2005

Related U.S. Application Data

(63) Continuation of application No. 09/738,913, filed on Dec. 13, 2000, now Pat. No. 6,907,490.

(51) Int. Cl.
*G06F 13/40* (2006.01)
*H04L 12/28* (2006.01)

(52) U.S. Cl. .................. 710/307; 710/105; 370/431

(58) Field of Classification Search .............. 710/8, 710/10, 11, 14, 2, 104, 105, 305, 316, 307, 710/38; 370/437, 431, 465, 468
See application file for complete search history.

(56) References Cited

U.S. PATENT DOCUMENTS

| | | | |
|---|---|---|---|
| 5,166,674 A | 11/1992 | Baum et al. | |
| 5,386,466 A | 1/1995 | Bales et al. | |
| 5,608,446 A | 3/1997 | Carr et al. | |
| 5,828,865 A | 10/1998 | Bell | |
| 5,884,071 A | 3/1999 | Kosaraju | |
| 5,959,995 A | 9/1999 | Wicki et al. | |
| 5,978,387 A | * 11/1999 | Sherman | ............... 370/468 |
| 6,061,510 A | 5/2000 | Klein et al. | |

(Continued)

FOREIGN PATENT DOCUMENTS

EP 0 373 299 A2 6/1990

(Continued)

OTHER PUBLICATIONS

Feridun et al., "Implementing OSI Agent/Managers for TMN", Communications Magazine, IEEE, vol. 34, Issue 9, Sep. 1996, p. 62-67.

(Continued)

*Primary Examiner*—Rehana Perveen
*Assistant Examiner*—Trisha Vu
(74) *Attorney, Agent, or Firm*—Blakley, Sokoloff, Taylor & Zafman LLP (57) ABSTRACT

The invention generally relates to a method, apparatus, and system to change one or more communication pathways in a processor without changing a physical component layout in the processor. For example, in an embodiment, the invention generally relates to a routing agent to change one or more communication pathways in a processor without changing the physical component layout in the processor. In an embodiment, the invention generally relates to the following method. The method comprises sending a control signal to one or more components within a processor to change one or more communication pathways in the processor without changing the physical component layout in the processor. In an embodiment, the invention generally relates to a method of changing the bandwidth between a processor and a device exterior to the processor without changing the physical component layout in the processor.

21 Claims, 8 Drawing Sheets

U.S. PATENT DOCUMENTS

| | | | |
|---|---|---|---|
| 6,148,356 A * | 11/2000 | Archer et al. | 710/307 |
| 6,151,689 A | 11/2000 | Garcia et al. | |
| 6,252,527 B1 * | 6/2001 | Yang | 341/100 |
| 6,278,695 B1 | 8/2001 | Christensen et al. | |
| 6,321,269 B1 | 11/2001 | Walker | |
| 6,337,877 B1 | 1/2002 | Cole et al. | |
| 6,449,273 B1 | 9/2002 | Jennings, III | |
| 6,473,814 B1 * | 10/2002 | Lyons et al. | 710/35 |
| 6,535,939 B1 | 3/2003 | Arimilli et al. | |
| 6,633,946 B1 * | 10/2003 | Hendel | 710/317 |
| 6,654,909 B1 | 11/2003 | Quach et al. | |
| 6,675,248 B1 | 1/2004 | Olarig et al. | |
| 6,675,266 B1 | 1/2004 | Quach et al. | |
| 2002/0133620 A1 | 9/2002 | Krause | |

FOREIGN PATENT DOCUMENTS

WO   PCT/US 01/43638      11/2001

OTHER PUBLICATIONS

Raman L, "OSI Systems and Network Management", Communications Magazine, IEEE, vol. 36, Issue 3, Mar. 1998, pp. 46-53.

Murayama et al., "A Study of High-Performance Communication Mechanism for Multicomputer Systems", Parallel Processing Symposium, 1996, Proceedings of IPPS '96, The 10th International, Apr. 15-19, 1996, pp. 76-83.

* cited by examiner

METHOD AND AN APPARATUS FOR A RE-CONFIGURABLE PROCESSOR

RELATED APPLICATIONS

The present patent application is a Continuation of prior application Ser. No. 09/738,913, filed Dec. 13, 2000 now U.S. Pat. No. 6,907,490, entitled A METHOD AND AN APPARTUS FOR A RE-CONFIGURABLE PROCESSOR.

FIELD OF THE INVENTION

This invention generally relates to changing the bandwidth between a device and a processor. More particularly this invention relates to an apparatus and method capable of changing the bandwidth between a device and a processor without changing the physical component layout in the processor.

BACKGROUND OF THE INVENTION

Figure 1:
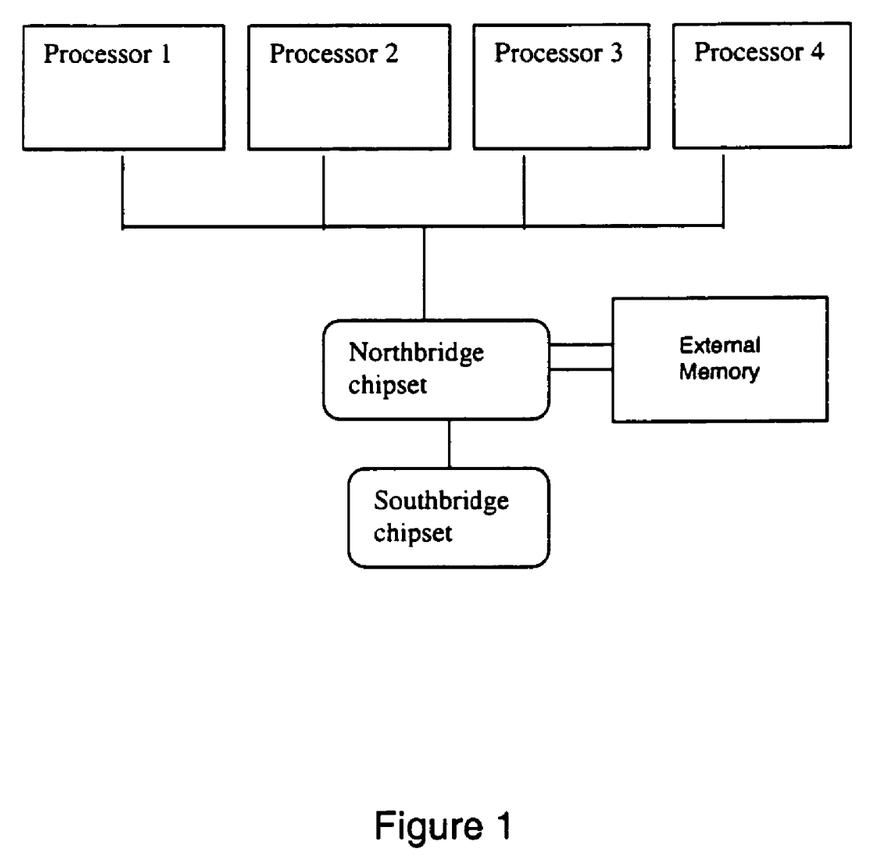
FIG. 1 illustrates a four processor (4P) architecture used in conjunction with a shared bus.

Joining several processors in parallel increases processing capacity. Typically, any number from two to eight processors may be joined in parallel. Generally, multiple parallel processors are joined together on a shared bus. FIG. 1 illustrates a four processor (4P; architecture used in conjunction with a shared bus. Four processors, Processor 1, Processor 2, Processor 3, and Processor 4, connect to a shared bus, which in turn connects to the Northbridge chipset. The Northbridge chipset further connects to the Southbridge chipset and external memory. For example, a Pentium™ processor may employ the shared bus architecture illustrated in FIG. 1. However, a point-to point architecture, typically, provides a higher bandwidth than does a shared bus architecture.

In a shared bus architecture, multiple devices all share the same bus and must follow an order and protocol to use the bus. In contrast, a point-to-point bus architecture provides an uninterrupted connection between two separate devices. Thus, in general, a point-to-point bus creates a higher bandwidth between two separate devices. A higher bandwidth can have the beneficial effect of yielding an increased performance from a single processor or group of processors. For example, if a 48-bit connection exists between two devices, then transactions occur between the two device three times faster than if only a 16-bit connection exists between the two devices. However, a point-to-point bus architecture may have a disadvantage because the architecture provides an uninterrupted connection between two separate devices. Thus, if at any given time, light transfers of information occur between the two devices, then the excess bandwidth capacity is essentially wasted.

For example, if a customer is using his or her computer system to run both a workstation application and a server application, then the customer may not be achieving peak performance from the hardware in his computer system. In a server application a heavy exchange of information occurs between processors. Thus, the manufacturer creates a high bandwidth connection between each processor in the system. Yet, if for example a customer wants to use his computer system for an application, which involves a heavy exchange of information between processors and a chipset, such as a workstation application, then the manufacturer creates a high bandwidth connection between each processor and the chip in the system. However, if the customer has a computer system which has a high bandwidth connection between the processor(s) and the chipset, but chooses to currently run a server application on this system, then the customer may suffer poor performance from the server application and waste the excess bandwidth between the chipset and processor(s).

BRIEF DESCRIPTION OF THE DRAWINGS

The drawings refer to the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

A person skilled in the art will appreciate that various deviations from the described embodiments of the invention are possible and that many modifications and improvements may be made within the scope and spirit thereof. For example, in several described embodiments specific clock speeds, specific number of data bits, specific number of layers, a specific number of components, etc. are used within this description to illustrate embodiments of the invention. However, a person skilled in the art will appreciate that embodiments of this invention specifically include various deviations from the specific number given in a particular embodiment described herein for illustrative purposes.

A routing agent may be used with a processor in a point-to-point architecture to allow a customer to change the bandwidth, or number of bus lines and clock speed, between two devices. A point-to-point bus architecture provides an uninterrupted connection between two separate devices. Generally, a packet based protocol transfers information in a point-to-point bus architecture. The routing agent may alter the effective bandwidth between a processor and a device exterior to the processor by changing one or more communication pathways in the processor without changing a physical component layout in the processor. Bandwidth is the total amount of information that can be transferred within a given time period between two devices. In an embodiment, the manufacturer or the customer may change the number of ports linked between the two devices to increase the bandwidth between the devices. In an embodiment, the manufacturer or the customer may add additional processors linked to a device by changing the number of ports linked between a first processor and the device exterior to the first processor.

Figure 2:
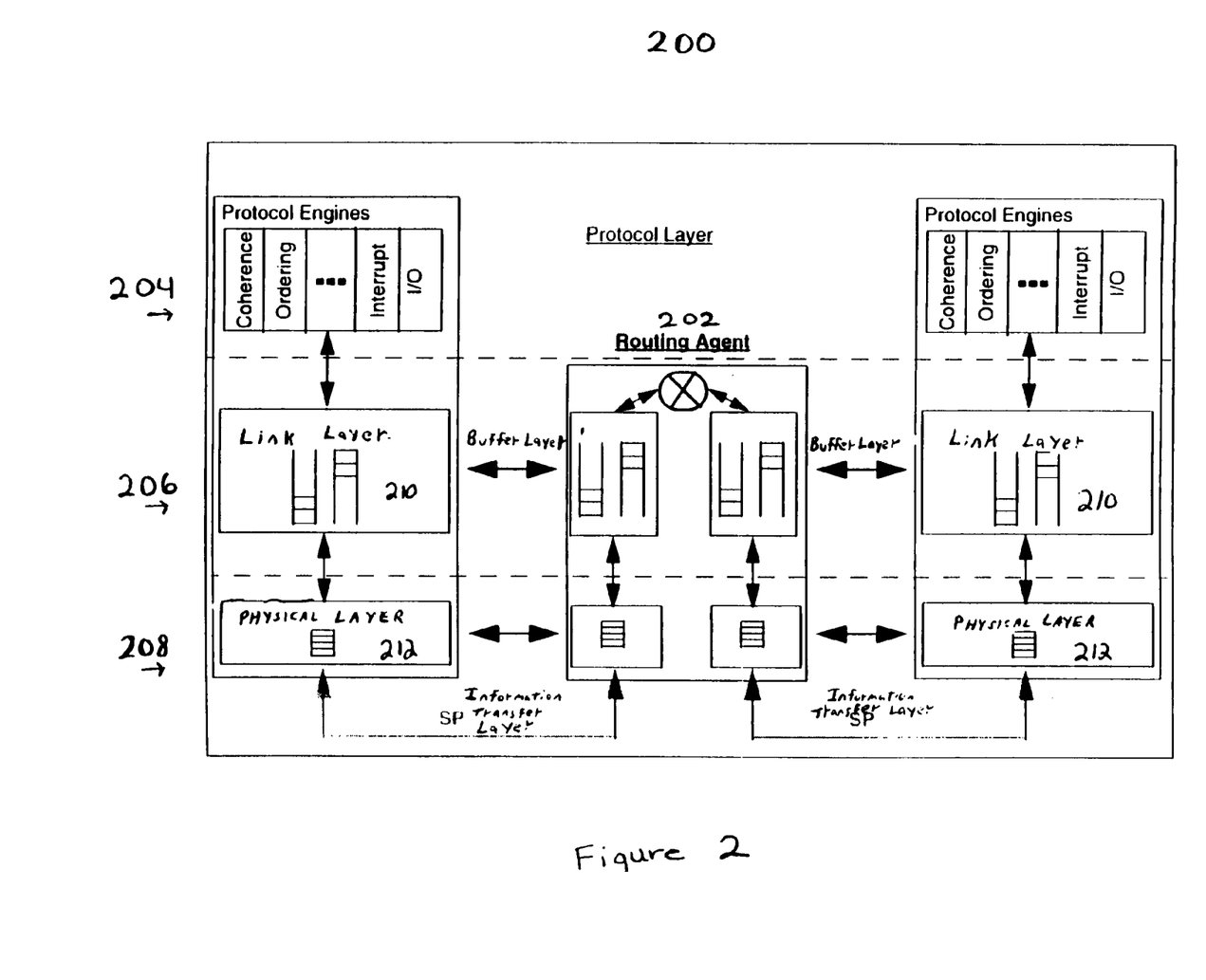
FIG. 2 illustrates an embodiment of a processor having a routing agent, a protocol layer, a buffer layer, and an information transfer layer.

FIG. 2 illustrates an embodiment of a processor 200 having a routing agent 202, a protocol layer 204, a buffer layer 206, and an information transfer layer 208. In one embodiment, the processor 200 has a routing agent 202 and three layers, the protocol layer 204, a buffer layer 206 such as one or more link layers 210, and an information transfer layer 208 such as one or more physical layers 212. The routing agent 202 changes the communication pathways within the physical layer 212 and link layer 210 without changing the physical component layout in the processor 200. The physical layer 212 carries out the actual physical transfer of information to and from other devices. The link layer 210 performs liaison functions between the higher functions of the protocol layer 204 and the physical layer 212. The protocol layer 204 processes requests, responses, and data transfers.

In an embodiment, the routing agent 202 may be internal or external to the processor 200. In an embodiment, a single routing agent 202 controls the communication pathways in all the layers of the processor 200. In an alternative embodiment, multiple routing agents 202 exist to control the communication pathways. The routing agent 202 may be a combination of hardware and software. The routing agent 202 may have several functions such as sending an enable/disable signal to one or more communication pathway switching devices and sending a signal to change various clocking speeds. The buffer layer 206 may have one or more inbound communication pathways. The buffer layer 206 may have one or more outbound communication pathways. The information transfer layer 208 may have one or more inbound communication pathways. The information transfer layer 208 may have one or more outbound communication pathways.

Figure 3:
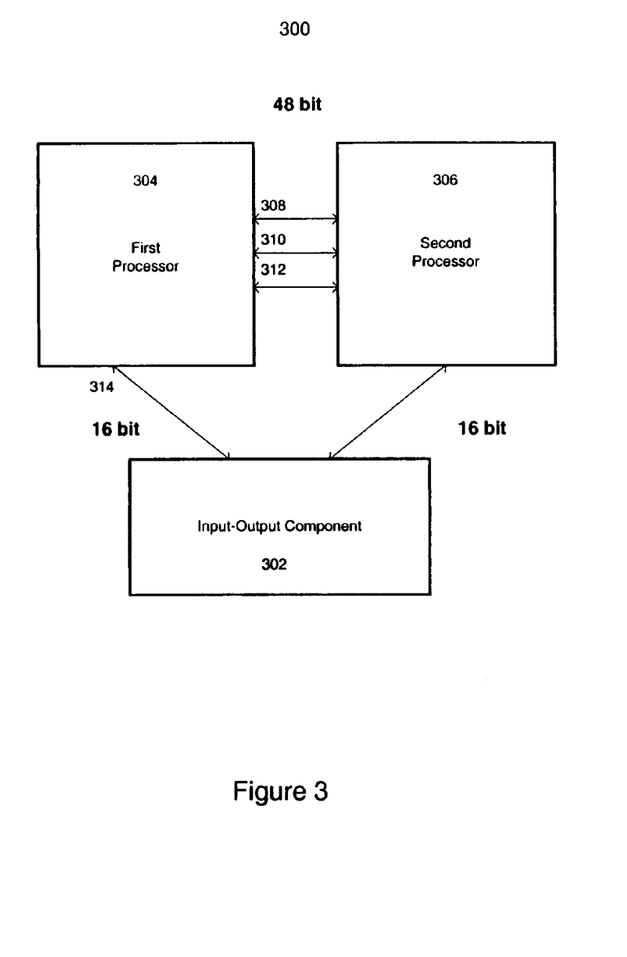
FIG. 3 illustrates a two processor point-to-point architecture having a 16-bit point-to-point connection between: 1) an input-output component and the first processor; as well as 2) the input-output component and the second processor.

FIG. 3 illustrates a two processor point-to-point architecture 300 having a 16-bit point-to-point connection between: 1) an input-output component 302 and the first processor 304; as well as 2) the input-output component 302 and the second processor 306. A first processor 304 having four 16-bit ports 308, 310, 312, 314 connected to the processor may have three 16-bit ports 308, 310, 312 connected to a second processor 306 and one 16-bit port connected 314 to the input-output component 302. In an embodiment, the input-output component maybe a bridge, a memory, a chipset or similar component. Thus, a 48-bit bandwidth connection exists between the first processor 304 and the second processor 306. Further, the first processor 304 and the second processor 306 have a 16-bit bandwidth connection to the input-output component 302. The routing agent can change the communication pathways in the first processor 304 such that the processor now has two 16-bit point-to-point (32-bit) connections to the second processor 306 and a 32-bit connection to the input-output component 302.

Figure 4:
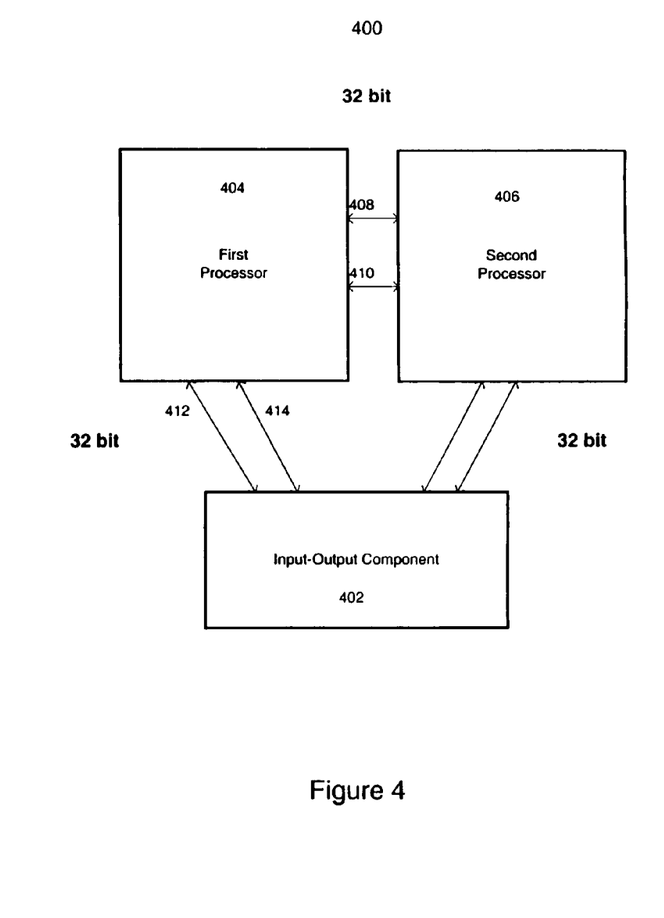
FIG. 4 illustrates a two processor point-to-point architecture having a 32-bit point-to-point connection between: 1) the input-output component and the first processor; as well as 2) the input-output component and the second processor.

FIG. 4 illustrates a two processor point-to-point architecture 400 having a 32-bit point-to-point connection between: 1) the input-output component 402 and the first processor 404; as well as 2) the input-output component 402 and the second processor 406. A first processor 404 having four 16-bit ports 408, 410, 412, 414 connected to the processor may have two 16-bit ports connected to a second processor 406 and two 16-bit ports connected to the input-output component 402 such as a chip set. Thus, a 32-bit bandwidth connection exists between the first processor 404 and the second processor 406. Further, the first processor 404 and the second processor 406 have a 32-bit bandwidth connection to the input-output component 402. In the 32-bit mode as compared to 16-bit mode, the bandwidth between the input-output component 402 and the first processor 404 as well as the input-output component 402 and the second processor 406 has effectively doubled. In 16-bit mode, eight clock cycles must occur to transfer eight 16-bit packets (128 bits) of information between each processor and the input-output component. In 32-bit mode, four clock cycles must occur to transfer four 32-bit packets (128 bits) of information between each processor and the input-output component.

Figure 5:
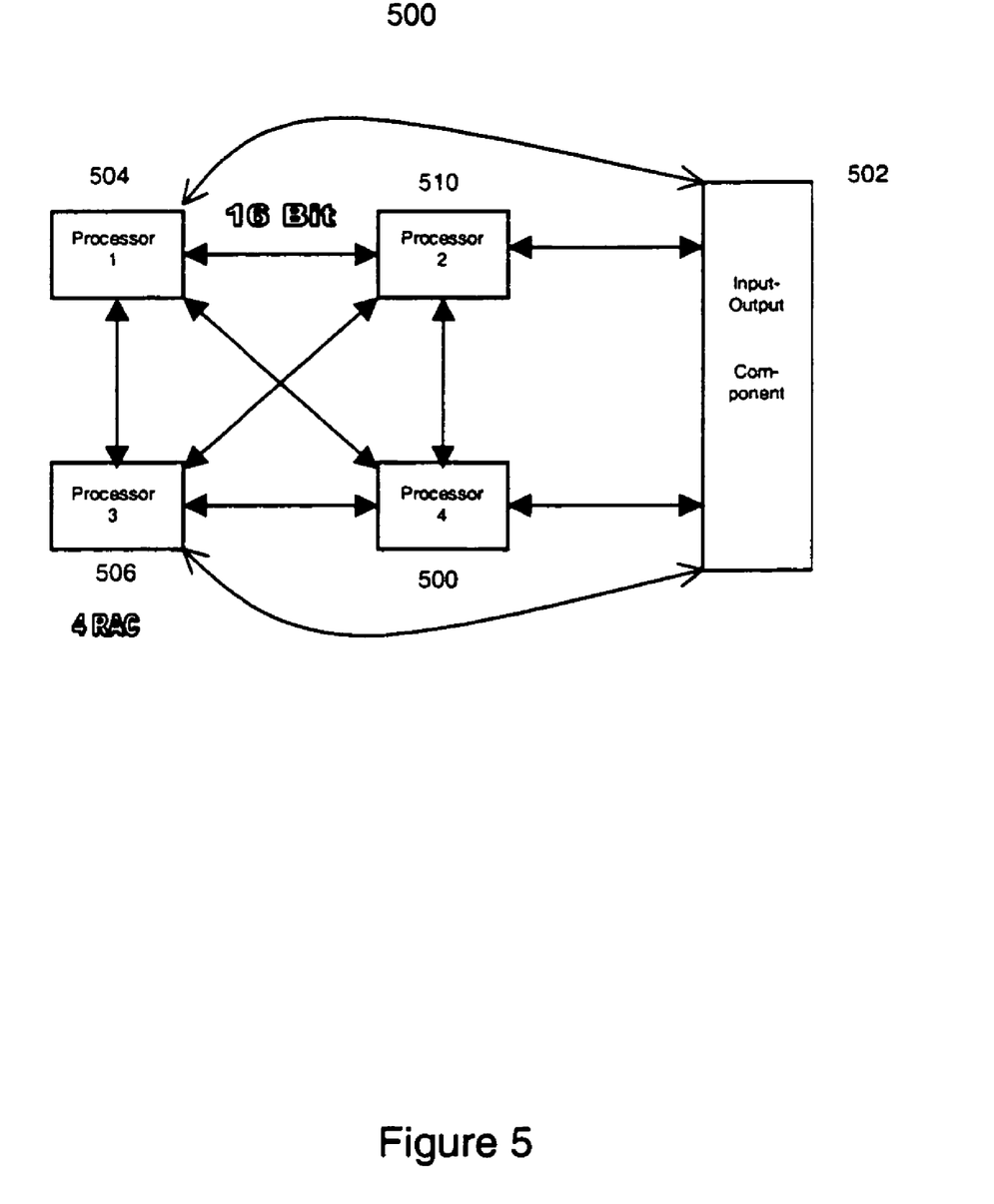
FIG. 5 illustrates a four processor point-to-point architecture having a 16-bit point-to-point connection between an input-output component and each of the four processors.

FIG. 5 illustrates an embodiment of a four processor point-to-point architecture 500 having a 16-bit point-to-point connection between an input-output component 502 and each of the four processors 504, 506, 508, 510. The four processors are processor 1 504, processor 2 506, processor 3 508, and processor 4 510. In an embodiment, each of the four processors 504, 506, 508, 510 employs an embodiment of the arbiter. The processors 504, 506, 508, 510 have a flexible architecture that coordinates with the arbiter to allow a variety of uses for these processors 504, 506, 508, 510. For example, the four processor architecture 500 may be substituted with the two processor architecture employing a 32-bit connection with the input-output component 502. Thus, the processing power of this arrangement has effectively doubled because four processors will process the data coming from the input-output component 502. Thus, an embodiment of the arbiter allows the same input-output component 502 to work with either a two processor architecture, a four processor architecture 500 or other similar multiple processor architecture.

A programmable knob setting in a configuration register directs the routing agent to establish the customer's current desired configuration such as a 16-bit, 32-bit, or 48-bit point-to-point connection between the processor and a device exterior to the processor. In an embodiment, the device exterior to the processor may be another processor, an input-output device, a bridge or other similar device. In an embodiment, the customer programs the knob setting to establish the bandwidth connections between the processor and devices exterior to the processor. Based on the knob setting of the configuration register, the routing agent enables and disables communication pathways within the information transfer layer and buffer layer. The routing agent may change the communication pathways to increase or decrease the number of processor ports, and thus, the effective bandwidth, between a processor and another device.

Typically, in a server, a large exchange of data occurs between a first processor and a second processor. Thus, having a 48-bit point-to-point connection between these two devices greatly decreases the time required to complete each transaction between the devices. Typically, in a workstation, a large exchange of data occurs between a each processor and the input-output component. Thus, having a 32-bit or 48-bit point-to-point connection between these devices greatly decreases the time required to complete each transaction between the devices. Those ordinarily skilled in the art will recognize the specific components illustrated in the following embodiments may be deviated from and still be within the spirit of this invention.

Figure 6:
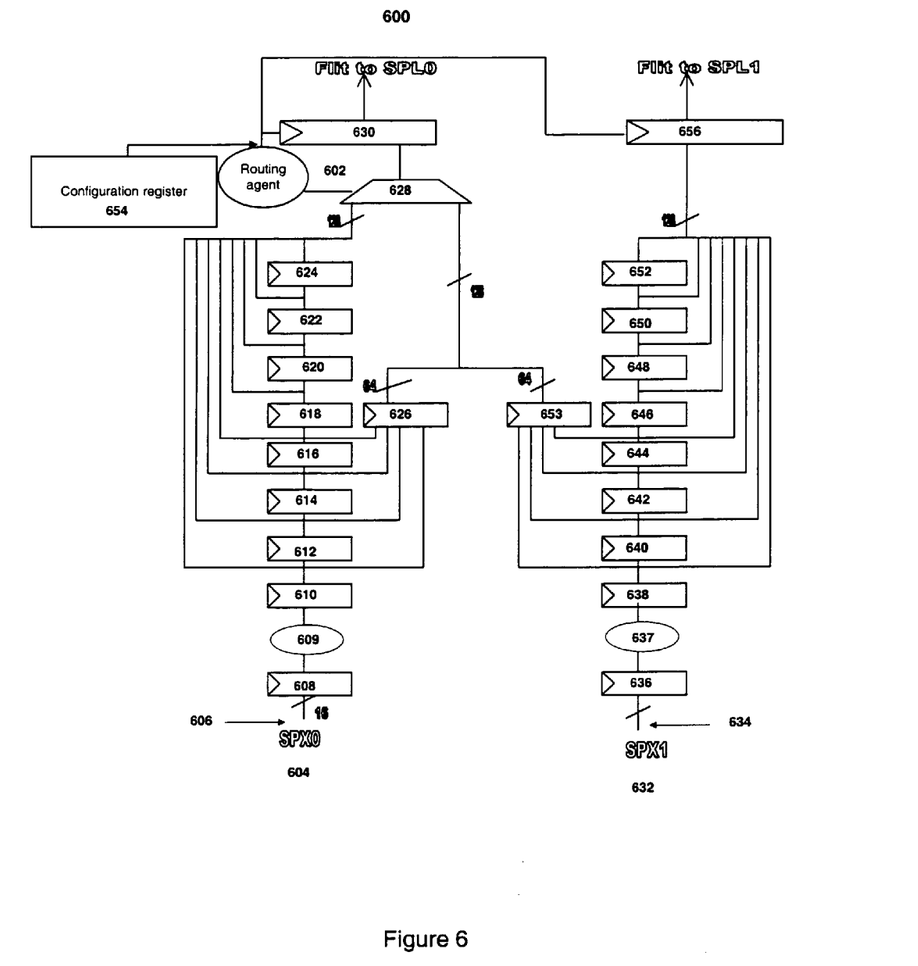
FIG. 6 illustrates an embodiment of the routing agent controlling the inbound communication pathways in an embodiment of the information transfer layer.

FIG. 6 illustrates an embodiment of the routing agent 602 controlling the inbound communication pathways in an embodiment of the information transfer layer 600. The first physical layer (SPX0) 604 has a first port 606; nine 16-bit registers, a first register 608, a second register 610, a third register 612, a fourth register 614, a fifth register 616, a sixth register 618, a seventh register 620, an eighth register 622, and a ninth register 624; first 64-bit register 626; a communication pathway switching device 628 such as a multiplexer; an embodiment of the routing agent 602; a first time delay 609, and a first flip flop 630. The second physical layer (SPX1) 632 has a second port 634; nine 16-bit registers, a tenth register 636, an eleventh register 638, a twelfth register 640, a thirteenth register 642, a fourteenth register 644, a fifteenth register 646, a sixteenth register 648, a seventeen register 650, and an eighteenth register 652; a second 64-bit register 653; and a second time delay 637, and a second flip flop 656. A multiplexer is a device that merges several low-speed transmissions into one high-speed transmission and vice versa. The configuration register 654 informs the routing agent 602 whether a particular component exterior to the processor should be a 16-bit, 32-bit or 48-bit-point-to-point connection.

If the configuration register 654 is programmed for a 16-bit point-to-point connection to the input-output component, then the routing agent 602 directs each physical layer to act independently of the other physical layers. In an embodiment of a four processor architecture for example, the first port 606 connects to a second processor and the second port 634 links up to an input-output component. The first register 608 receives an inbound 16-bit packet of information through the first port 606. This 16-bit packet of information is sent from the first register 608 through a first time delay 609 to be stored in the second register 610. The first register 608 receives another inbound 16-bit packet of information through the first port 606. The first register 608 sends this second 16-bit packet of information to be stored in the third register 612. The first physical layer 604 repeats this process until the second register 610 through the ninth register 624 are each storing 16-bit packets of information. The first communication pathway switching device 628 senses that these eight 16-bit (or 128-bits) of information are ready to be transferred to the first link layer through the first flip flop 630. Upon the next clock cycle the 128-bits of information are transferred to the first link layer through the first flip flop 630. In a similar manner but using the components of second physical layer 632, the second physical layer 632 transfers 128-bits to the second link layer. However, the 128-bits of information that are transferred to the first link layer are unrelated to the 128-bits of information that are transferred to the second link layer. Thus, in our example the first 128-bits of information come through the first port 606 from a second processor. Similarly, the second 128-bits of information come through the second port 634 from the input-output component. The routing agent 602 enables the 128-bit path in the first communication pathway switching device 628. The routing agent 602 disables the dual 64-bit path in the first communication pathway switching device 628. The routing agent 602 enables the first flip flop 630 and the second flip flop 656.

If the configuration register 654 is programmed for a 32-bit point-to-point connection, then the routing agent 602 gangs two physical layers to act together. The routing agent 602 disables the 128-bit path in the first communication pathway switching device 628. The routing agent 602 enables the dual 64-bit path in the first communication pathway switching device 628. The routing agent 602 enables the first flip flop 630 but disables the second flip flop 656. The routing agent 602 increases the clocking speed for the first register 608 through the eighteenth register 652 by a factor of two. The first physical layer 604 receives four 16-bit packets of information and stores the packets of information in the second register 610 through the fifth register 616. The second physical layer 632 receives four 16-bit packets of information and stores the packets of information in the eleventh register 638 through the fourteenth register 644. The first communication pathway switching device 628 senses that the first 64-bit register contains four 16-bit packets of information from the second register 610 through the fifth register 616. The first communication pathway switching device 628 senses that the second 64-bit register contains four 16-bit packets of information from the eleventh register 638 through the fourteenth register 644. Upon the next clock cycle, the 64-bits of information from the first 64-bit register and the 64-bits of information from the second 64-bit register are transferred up to the first communication pathway switching device 628 through the dual 64-bit path. The first communication pathway switching device 628 transfers the eight related 16-bit packets of information to the first link layer. Both the device exterior to the processor and the processor transfer the eight related 16-bit packets of information as if a 32-bit point-to-point connection exists between the processor and the device. The second link layer receives no signal because the second flip flop 656 is disabled. In a similar manner, the routing agent may gang three physical layers together to create a 48-bit point-to-point connection between the processor and the device.

Figure 7:
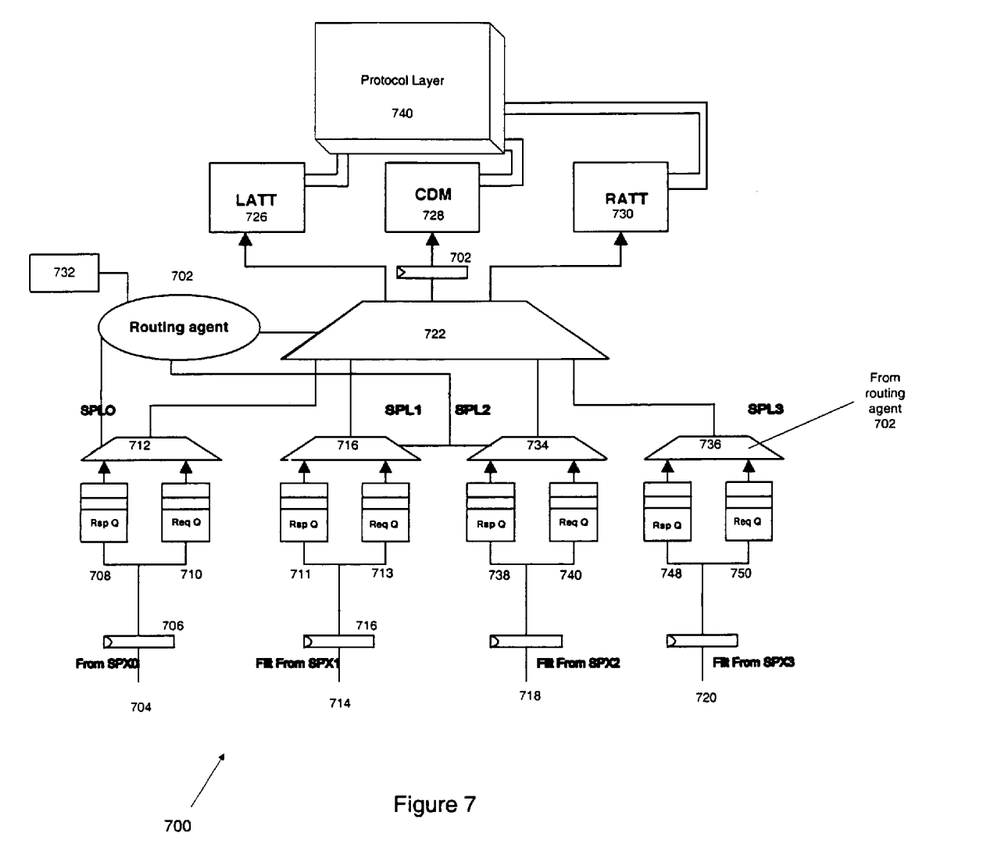
FIG. 7 illustrates an embodiment of the routing agent controlling the inbound communication pathways in an embodiment of the buffer layer.

FIG. 7 illustrates an embodiment of the routing agent 702 controlling the inbound communication pathways in an embodiment of the buffer layer 700. The inbound communication pathway of the first link layer 704 has a first 128-bit register 706, a first response queue 708, a first request queue 710, and a first communication pathway switching device 712. The inbound communication pathway of the second link layer 714 has a second 128-bit register 716, a second response queue 711, a second request queue 713, and a second communication pathway switching device 716. The component makeup of the third link layer 718 and fourth link layer 720 are similar to the first link layer 704. The first link layer 704 through the fourth link layer 720 feed into a fifth communication pathway switching device 722, an embodiment of a routing agent 702, a fifth 128-bit register 724, a local address transaction tracker buffer (LATT) 726, a central data management buffer (CDM) 728, and a remote address transaction tracker buffer (RATT) 730.

In an embodiment of the inbound buffer layer 700, if the configuration register 732 is programmed for a 32-bit point-to-point connection, then the routing agent 702 effectively gangs two link layers together. The first link layer 704 receives the eight related 16-bit packets (128-bit) of information at twice the clock speed from the communication switching device in the first physical layer. The first link layer 704 stores the 128-bit packet of information in the first register 706. The 128-bit packet of information is routed appropriately to either the first response queue 708 or the first request queue 710. The routing agent 702 sends an enablement signal to the first communication pathway switching device 712, third communication pathway switching device 734, and fifth communication pathway switching device 722. The routing agent 702 also sends a disable signal to the second communication pathway switching device 716 and fourth communication pathway switching device 736. The routing agent 702 directs the fifth communication pathway switching device 722 to request data only from the first communication pathway switching device 712 and the third communication pathway switching device 734. In 32-bit mode, the second communication pathway switching device 716 and fourth communication pathway switching device 736 receive no signal from the physical layer because the routing agent 702 disabled the second flip flop and fourth flip flop in the physical layer.

The 128-bit packets of information are transferred to the fifth communication pathway switching device 722 through the first communication pathway switching device 712 and then the third communication pathway switching device 734 in a cyclic sequential manner. In a repeating cycle, the fifth communication pathway switching device 722 requests the contents of the first response queue 708, then the first request queue 710, then the third response queue 738, then the third request queue 740, and then repeats this sequence. Every packet of information may be either a request for a command and/or data or a response to a command or data. In an embodiment, once a packet is written into a response queue or request queue, then the information is transferred from these queues at core clock frequency. The packets of information are sent from the fifth communication pathway switching device 722 to one of the following three components. The central data management buffer (CDM) 728 stores data to be consumed by the protocol layer 740. The remote address transaction tracker buffer (RATT) 730 stores commands from a remote device such as a request from a remote processor. The CDM 728 stores corresponding data, if any, associated with that command. Similarly, the local address transaction tracker buffer (LATT) 726 stores local commands and responses made by the processor core. The corresponding data, if any, associated with that command is stored in the CDM 728.

If the configuration register 732 is programmed for a 16-bit point-to-point connection, then each inbound link layer 704, 714, 718, 720 acts independently. The routing agent 702 directs the fifth communication pathway switching device 722 to request information out of the eight possible sources, the corresponding request queue 710, 713, 740, 750 or the corresponding response queue 708, 711, 738, 748 in each link layer 704, 714, 718, 720, in a cyclic sequential manner. If a particular queue is empty, then the communication pathway switching device 722 automatically pulls packets out of the next queue without any penalty. In an embodiment, the packets from the four physical layers are written into the appropriate queue at 100 megahertz, if the configuration register is programmed for a 16-bit connection. The packets are written into the queues at 200 Megahertz if the configuration register 732 is programmed for a 32-bit connection. If the configuration register is configured for a 48-bit connection, then the routing agent 702 gangs three link layers together. Once the fifth communication pathway switching device 722 picks a packet of information from one of the eight possible sources, then the packet is sent to the to the protocol layer 740.

The inbound link layer sends responses and requests to protocol layer 740. The protocol layer 740 alternates choosing a command from the LATT 726 or RATT 730 accompanied by data from the CDM 728. In one embodiment, this physical information may be sent to a CPU. The information goes to the CPU to be processed and sent to the outbound bound link layer. The protocol layer 740 typically is the processing component. The protocol layer 740 typically resolves requests from other local processors and sends requests out through the physical layer. The protocol layer 740 may be responsible for functions such as ordering, conflict detection, and coherence. The protocol layer 740 may forward requests for data to the local memory controller if the request is made to local memory. The protocol layer 740 may send snoop requests to the remote nodes and other local processors. The protocol layer 740 also processes requests made through the link layer, which may come from a remote processor or an input-output component.

Figure 8:
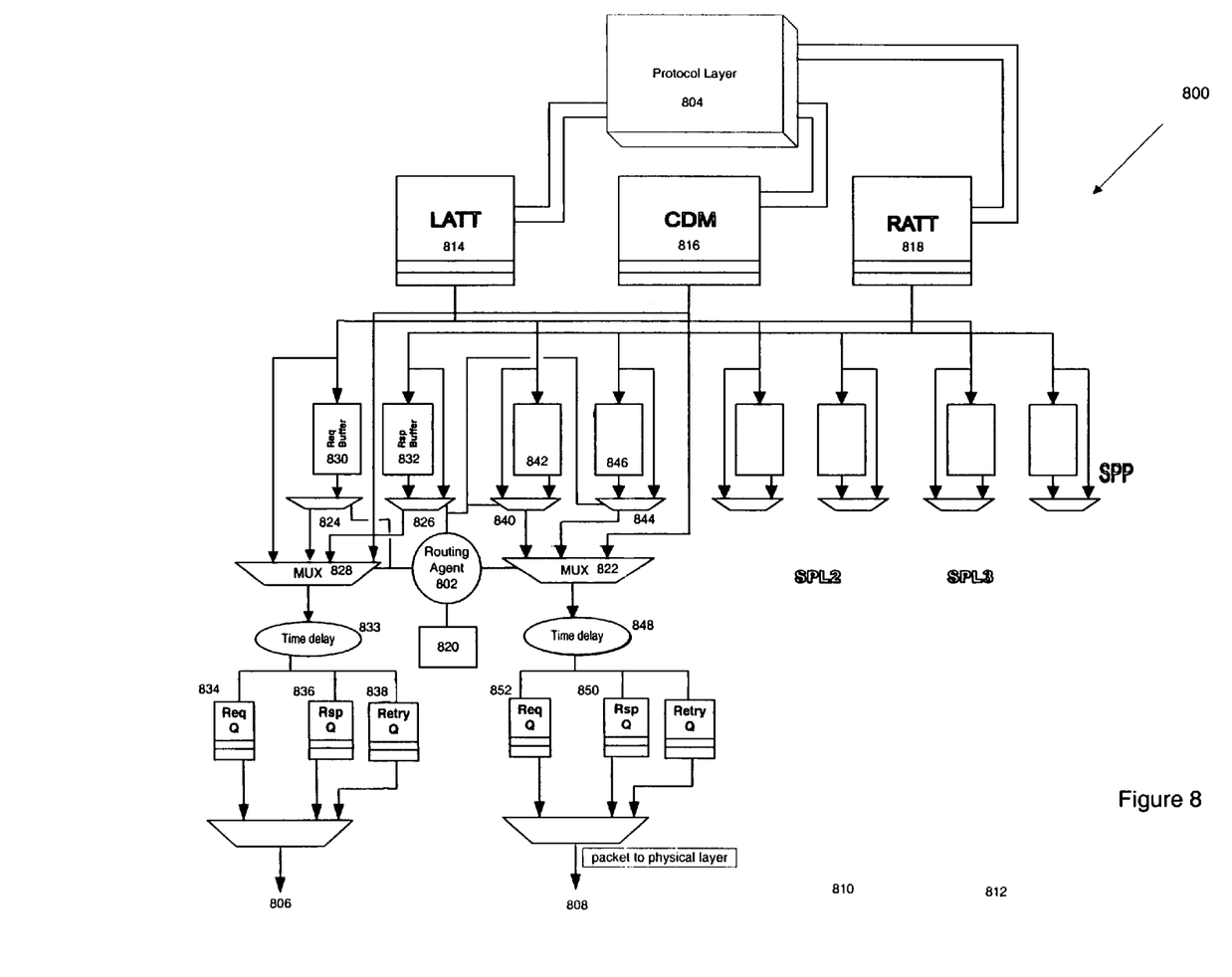
FIG. 8 illustrates an embodiment of the routing agent controlling the outbound communication pathways in an embodiment of the buffer layer.

FIG. 8 illustrates an embodiment of the routing agent 802 controlling the outbound communication pathways in an embodiment of the buffer layer 800. The protocol layer 804 sends the processed data and commands to each outbound link layer 806, 808, 810, 812. The protocol layer 804 delivers commands generated from itself to the LATT 814 and data, if any, corresponding to that command to the CDM 816. The protocol layer 804 delivers responses to commands from remote devices to the RATT 818 and data, if any, corresponding to that command to the CDM 816. If the configuration register 820 is programmed for a 32-bit point-to-point connection, then the routing agent 802 effectively enables two of the four outbound link layers. The following happens in tracing the signal path in the first outbound link layer 806 and the second outbound link layer 808. The routing agent 802 directs the second communication pathway switching device 822 and the fourth communication pathway switching device (not shown) to be disabled. The routing agent 802 directs the fifth communication pathway switching device 828 to request data through the first communication pathway switching device 824 and third communication pathway switching device 826 from their respective request buffer 830 or response buffer 832. The fifth communication pathway switching device 828 alternates, in a repeating cycle, requests for bits from the request buffer 830 and the response buffer 832. The fifth communication pathway switching device 828 also receives any data, if any, corresponding to those commands from the CDM 816. The fifth communication pathway switching device 828 then routes the 128-bit data packet through a first time delay 833 to either the outbound response queue 836 or outbound request queue 834 located in the outbound physical layer.

One or more retry queues 838 exist in the outbound link layer. The retry queue 838 stores a duplication of the information to be transferred in case an error occurs in the transfer of the information. The retry queue 838 exists primarily in case there may be an error in the link. The retry queue 838 erases the duplicated information stored in a retry queue 838 upon receiving a confirmation of an error free transfer of information.

If the configuration register 820 is programmed for a 16-bit point-to-point connection, then the routing agent 802 directs each outbound link layer 806, 808, 810, 812 to act independently. The routing agent 802 sends a signal to enable all of the outbound link layer communication switching devices and set the clock speed to the default clock speed. The information is routed from the LATT 814, RATT 818, and CDM 816 through its own respective outbound link layer to the corresponding outbound physical layer. For example, the routing agent 802 directs the second communication pathway switching device 822 to request data through the sixth communication pathway switching device 840 from the second request queue 842 and then request data through the seventh communication pathway switching device 844 from the second response queue 846. The second communication pathway switching device 822 alternates, in a repeating cycle, requests for bits from the second response queue 842 and the second request queue 846. The second communication pathway switching device 822 also receives any data, if any, corresponding to those commands from the CDM 816. The second communication pathway switching device 822 then routes the 128-bit data packet through a second time delay 848 to either the second outbound response queue 850 or second outbound request queue 852 located in the outbound physical layer.

Figure 9:
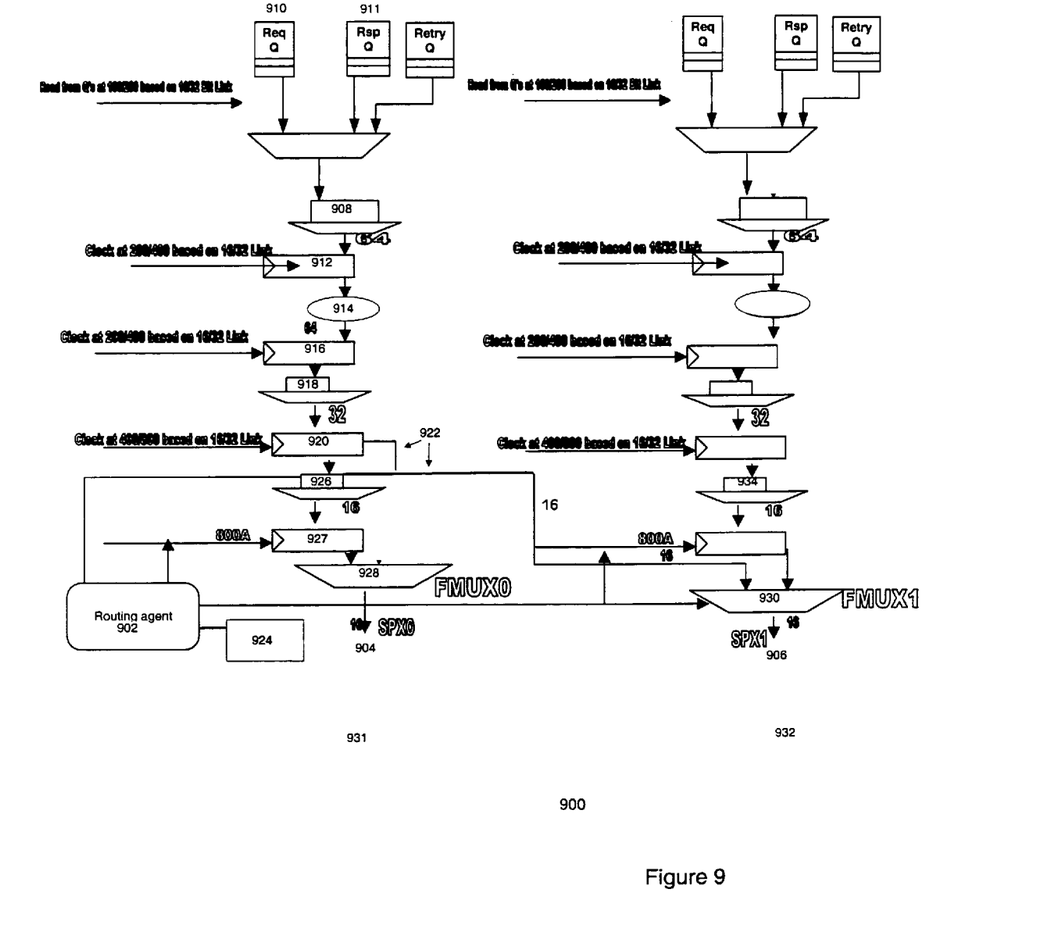
FIG. 9 illustrates an embodiment of the routing agent controlling the communication pathways in an outbound information transfer layer.

FIG. 9 illustrates an embodiment of the routing agent 902 controlling the communication pathways in an outbound information transfer layer 900. In an embodiment, the information transfer layer comprises one or more physical layers. The physical layer carries out the actual physical transfer of information to devices external to the processor through ports, such as a first port 904 and a second port 906. Typically, one 16-bit port exists on each physical layer such as the first port 904. The processor transfers information between itself and a device exterior to the processor through these ports. The information signal contains information such as a request, response, or data.

In an embodiment of a two processor architecture, for example, three ports hook up to the second processor in the system, and the fourth port hooks up an input-output component such as a chip set. A first communication pathway switching device 908 such a multiplexer receives a 128-bit packet of information from the link layer. The first communication pathway switching device 908 reads the 128-bit packet of information from either the response queue 911 or the request queue 910 at a clock speed of 100 megahertz for example. The signal output of the first communication pathway switching device 908 is two 64-bit packets of information, a first 64-bit packet and a second 64-bit packet which are stored in the first register 912. After a time delay 914, the second communication pathway switching device 918 reads the first 64-bit packet through the second register 916 at twice the clock speed, 200 megahertz, of the 128-bit packet of information. The signal output of the second communication pathway switching device 918 is two 32-bit packets of information, a first 32-bit packet and a second 32-bit packet which are stored in the third register 920. The clock speed of 32-bit packet of information in the third register is again doubled to 400 megahertz.

The routing agent 902 now directs the 32-bit packet of information to take a 32-bit bypass path 922 or a 16-bit information transfer path in the corresponding communication pathway switching devices 926, 934. The configuration register 924 informs the routing agent 902 whether the component exterior to the processor should be a 16-bit, 32-bit or 48-bit-point-to-point connection. In one embodiment, for example, if a 16-bit point-to-point connection exist between the processor and the input-output component, then routing agent 902 directs each physical layer to act independently of the other physical layers. A fourth communication pathway switching device 926 reads the 32-bit packet of information at 400 megahertz from the third register 920 and outputs two 16-bit packets of information. A fifth communication pathway switching device 928 reads the 16-bit packet of information at 400 megahertz from the forth register 927 and outputs the 16-bit packet of information to the first port 904. The routing agent 902 sends a signal to the sixth communication pathway switching device 930 in the second outbound physical layer 932. The signal enables the 16-bit path in the fifth communication pathway switching device 928. The routing agent 902 disables the 32-bit bypass path 922 from the fourth communication pathway switching device 926. The routing agent 902 also sends a signal to the second physical layer 932, the sixth communication pathway switching device 930, to enable the 16-bit path in the sixth communication pathway switching device 930 and disable/ignore the 32-bit bypass path 922 coming from the third register 920. Thus, the output from first port 904 and the second port 906 are unrelated 16-bit packets of information.

If in one embodiment for example, a 32-bit point-to-point connection exist between the processor and the input-output component, then the routing agent 902 gangs the output of the first port 904 and the output of the second port 906. The routing agent 902 sends a signal to the sixth communication pathway switching device 930. The routing agent's signal disables the 16-bit path in the sixth communication pathway switching device 930 and enables the 32-bit bypass path 922 coming from the third register 920. The routing agent 902 also sends a signal to the first physical layer 931, the fourth communication pathway switching device 926, to enable the 32-bit bypass path 922. Thus, the output from first port 904 and the second port 906 are related 16-bit packets of information. In other words, the output from first port 904 and the second port 906 is a 32-bit packet of information. In order to keep the same transfer speeds, the routing agent 902 also sends a signal to double the clocking speed that occurs in the registers. For example, the 32-bit packet of information in the third register 920 is now clocked at 800 megahertz. 800 megahertz is twice the clock speed of when the 16-bit information transfer was occurring. In a similar manner, the routing agent 902 can gang three ports together (not shown) to create a 48-bit connection in the outbound path.

In alternative embodiment, if three physical layers are linked to, for example, a second processor, then optionally the routing agent can be programmed to route the three related 16-bit packets destined for the second processor through the respective components of each link and physical layer. Thus, the first 16-bit packet travels through the components of the first physical layer and first link layer. The second 16-bit packet travels through the components of the second physical and second link layer. The third 16-bit packet travels through the components of the third physical layer and second link layer. The routing agent changes the addressing header in the three 16-bit packets to convey to the second processor that these three 16-bit packets are related.

The invention is subject to various modifications and alternative forms. Specific embodiments thereof have been shown only by way of example. The connections between the processor and the devices may be, for example, 8-bit to 64-bit or more. The clock speeds may be, for example, one megahertz to one gigahertz or more. The registers may be 1-bit to 128-bits or more. Further, most functions performed by the electronic hardware components may be duplicated by software emulation. Similarly, the functionality of each layer, the protocol layer, the buffer layer, and the information transfer layer may be combined, for example, on a single layer or transported to another component. The invention should be understood to not be limited to the particular forms disclosed, but on the contrary, the intention is to cover all modifications, equivalents, and alternatives falling within the spirit and scope of the invention as defined by the appended claims.

I claim:

1. An apparatus, comprising:
   a means for changing an amount of bandwidth between a processor and at least one device exterior to the processor without changing a physical component layer in the processor, the processor being directly and indirectly coupled to the at least one device; and a means for allowing a user of the processor to select the amount of bandwidth between the processor and at least a first device.

2. The apparatus of claim 1, further comprising:

a means for communicating between the processor and the first device through at least one point-to-point bus.

3. The apparatus of claim 1, wherein changing the bandwidth further comprises a means for altering a plurality of physical layers linked between the processor and the first device.

4. The apparatus of claim 3, wherein each physical layer comprises a port and a plurality of registers.

5. The apparatus of claim 4, wherein altering the plurality of physical layers further comprises a means for combining register output from at least a first and second physical layer based upon the user selected bandwidth.

6. The apparatus of claim 1, wherein the at least one device comprises another processor.

7. An apparatus, comprising:

a routing agent including a programmable logic device to select the bandwidth between a processor and at least a first device exterior to the processor without changing a physical component layer in the processor, the processor being directly and indirectly coupled to the first device, wherein the selected bandwidth is based upon a user's input.

8. The apparatus of claim 7, wherein the processor uses a point-to-point bus to communicate with the first device.

9. The apparatus of claim 7, wherein the programmable logic device includes a configuration register to alter a number of physical layers linked between the processor and each device.

10. The apparatus of claim 9, wherein the configuration register includes a programmable setting.

11. The apparatus of claim 9, wherein each physical layer comprises a port and a plurality of registers.

12. The apparatus of claim 7, wherein the first device comprises another processor.

13. A method, comprising:

changing an amount of bandwidth between a processor and at least one device exterior to the processor without changing a physical component layer in the processor, the processor being directly and indirectly coupled to the first device; and allowing a user of the processor to select the amount of bandwidth between the processor and at least a first device.

14. The method of claim 13, further comprising:

communicating between the processor and the first device through at least one point-to-point bus.

15. The method of claim 13, wherein changing the bandwidth comprises altering physical layers linked between the processor and the first device.

16. The method of claim 15, wherein each physical layer comprises a port and a plurality of registers.

17. The method of claim 16, wherein altering the physical layers comprises combining register output from each physical layer based upon the user selected bandwidth.

18. A system, comprising:

a plurality of processors;

a chipset coupled to at least a first processor;

a configuration register coupled to the one or more of the plurality of processors and programmable to allow a user to select a bandwidth between the first processor and the chipset; and a routing agent coupled to the configuration register to select the bandwidth between the first processor and the chipset without changing a physical component layer in the first processor; and an input-output device coupled to the first processor, wherein the configuration register to further allow a user to select the bandwidth between the first processor and the chipset and the first processor and the input-output device.

19. The system of claim 18, further comprising a plurality of physical layers coupled to the routing agent to change the bandwidth between the first processor and the chipset.

20. The system of claim 19, wherein each of the plurality of physical layers comprises a port and a plurality of registers.

21. The system of claim 18, further comprising at least one point-to-point bus to communicate between the first processor and the chipset.

* * * * *